(12) United States Patent
Evans

(10) Patent No.: US 6,793,176 B1
(45) Date of Patent: Sep. 21, 2004

(54) AUTOMATIC CONTROL OF AIR VEHICLE DURING CATAPULT LAUNCH

(75) Inventor: William P. Evans, Chesterfield, MO (US)

(73) Assignee: The Boeing Company, Chicago, IL (US)

( * ) Notice: Subject to any disclaimer, the term of this patent is extended or adjusted under 35 U.S.C. 154(b) by 47 days.

(21) Appl. No.: 10/456,727

(22) Filed: Jun. 6, 2003

(51) Int. Cl.[7] .................................................. B64F 1/04
(52) U.S. Cl. ........................ 244/63; 244/76 R; 244/194
(58) Field of Search ................................ 244/63, 76 R, 244/177, 181, 191, 194, 195

(56) References Cited

U.S. PATENT DOCUMENTS

| | | | | |
|---|---|---|---|---|
| 3,892,095 | A | * | 7/1975 | Vankuik et al. ............... 174/48 |
| 6,513,756 | B1 | * | 2/2003 | Lambiaso .................... 244/119 |
| 6,536,710 | B1 | * | 3/2003 | Bobzien et al. ............. 244/119 |
| 6,561,454 | B1 | * | 5/2003 | White, III .................... 244/1 R |
| 6,619,588 | B2 | * | 9/2003 | Lambiaso ................ 244/118.5 |
| 6,644,593 | B2 | * | 11/2003 | Lambiaso ................ 244/118.5 |
| 2003/0106963 | A1 | * | 6/2003 | Smallhorn .................. 244/125 |

* cited by examiner

*Primary Examiner*—Charles T. Jordan
*Assistant Examiner*—Stephen A. Holzen
(74) *Attorney, Agent, or Firm*—Marshall, Gerstein & Borun LLP

(57) ABSTRACT

A control system and method for automatic control of an air vehicle during catapult launch includes a first pitch axis partition that includes an altitude hold control loop and a vertical rate control loop, and a second pitch axis partition that includes a constant throttle airspeed hold control loop. The control system also includes a vertical acceleration command select loop. The altitude hold control loop and the vertical rate control loop cooperatively determine a vertical rate loop vertical acceleration command. The constant throttle airspeed hold control loop determines a constant throttle airspeed hold vertical acceleration command. The vertical acceleration command select loop selects one of either the vertical rate loop vertical acceleration command or the constant throttle airspeed hold vertical acceleration command. A flight control system of the air vehicle drives the air vehicle to the selected vertical acceleration command.

19 Claims, 4 Drawing Sheets

AUTOMATIC CONTROL OF AIR VEHICLE DURING CATAPULT LAUNCH

NOTICE OF GOVERNMENT RIGHTS

This invention was made with Government support under DARPA contract MDA972-00-9-0005 awarded by DARPA. The Government has certain rights in this invention.

FIELD OF INVENTION

This disclosure is related generally to control of air vehicles, and more particularly, to the automatic control of air vehicles during catapult launch.

BACKGROUND INFORMATION

Current aircraft use an Angle Of Attack based control system during catapult launch from an aircraft carrier. Angle Of Attack sensors have to be mounted externally on the aircraft. Accordingly, such sensors are subject to being damaged by the harsh aircraft carrier environment. Although multiple sensors can be mounted on the aircraft for redundancy, each sensor may provide different data because of sideslip and other factors. Furthermore, when a sensor fails, the signal from the remaining sensors are averaged, and a bad signal from one of the sensors gets averaged with the signals from the other sensors. Thus, only prompt and appropriate action by the pilot of the aircraft can control the aircraft in case of sensor failure.

SUMMARY OF THE INVENTION

A catapult launch control system for an air vehicle having a flight control system includes an inertial sensor system for providing a vertical rate of the air vehicle and a forward acceleration of the air vehicle. An altitude hold loop uses as input an altitude command and generates a vertical rate command. A vertical rate control loop uses as input the vertical rate command and the vertical rate to generate a vertical rate loop vertical acceleration command. A constant throttle airspeed hold loop uses as inputs an airspeed command and the forward acceleration to generate a constant throttle airspeed hold vertical acceleration command. A vertical acceleration command select loop uses the vertical rate loop vertical acceleration command and the constant throttle airspeed hold vertical acceleration command as inputs to provide a selected vertical acceleration command. The flight control system drives the air vehicle to the selected vertical acceleration command.

A method of controlling an air vehicle during catapult launch having a flight control system includes determining a vertical rate loop vertical acceleration command for the air vehicle to reach and maintain an altitude command. The determining of the vertical rate loop vertical acceleration command is based on inputs of a vertical rate of the air vehicle sensed by an inertial sensor system and an altitude of the air vehicle. The method also includes determining a constant throttle airspeed hold vertical acceleration command for the air vehicle to reach and maintain an airspeed command. The constant throttle airspeed hold vertical acceleration command is based on inputs of a forward acceleration of the air vehicle determined by the inertial sensor system and airspeed of the air vehicle. The method also includes determining a selected vertical acceleration command by selecting the maximum of the vertical rate loop vertical acceleration command or the constant throttle airspeed hold vertical acceleration command. The selected vertical acceleration command causes the flight control system to drive the air vehicle to the selected vertical acceleration command.

DETAILED DESCRIPTION OF THE INVENTION

Figure 1:
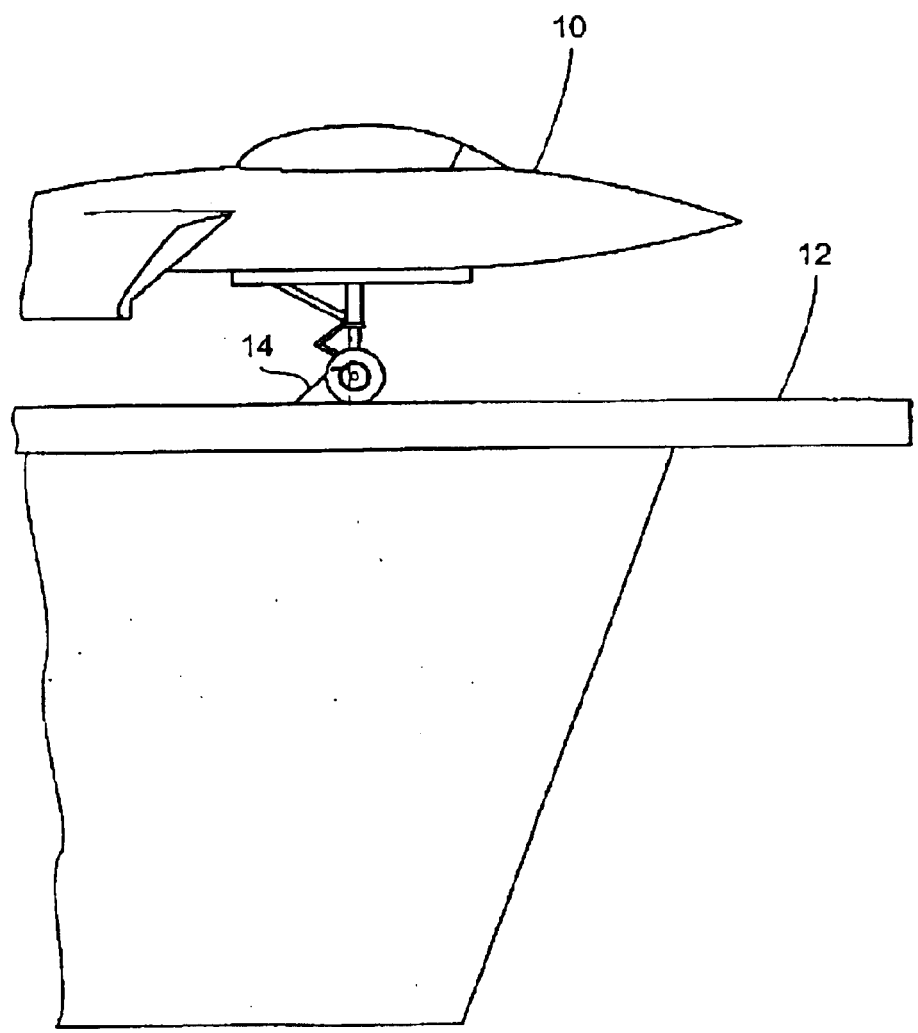
FIG. 1 is a side view of an air vehicle and catapult that may incorporate a control system for automatic control of the air vehicle during catapult launch in accordance with the teachings of the present disclosure.

Referring to FIG. 1, an air vehicle 10 is depicted on a flight deck 12 for launch using a catapult 14.

Figure 2:
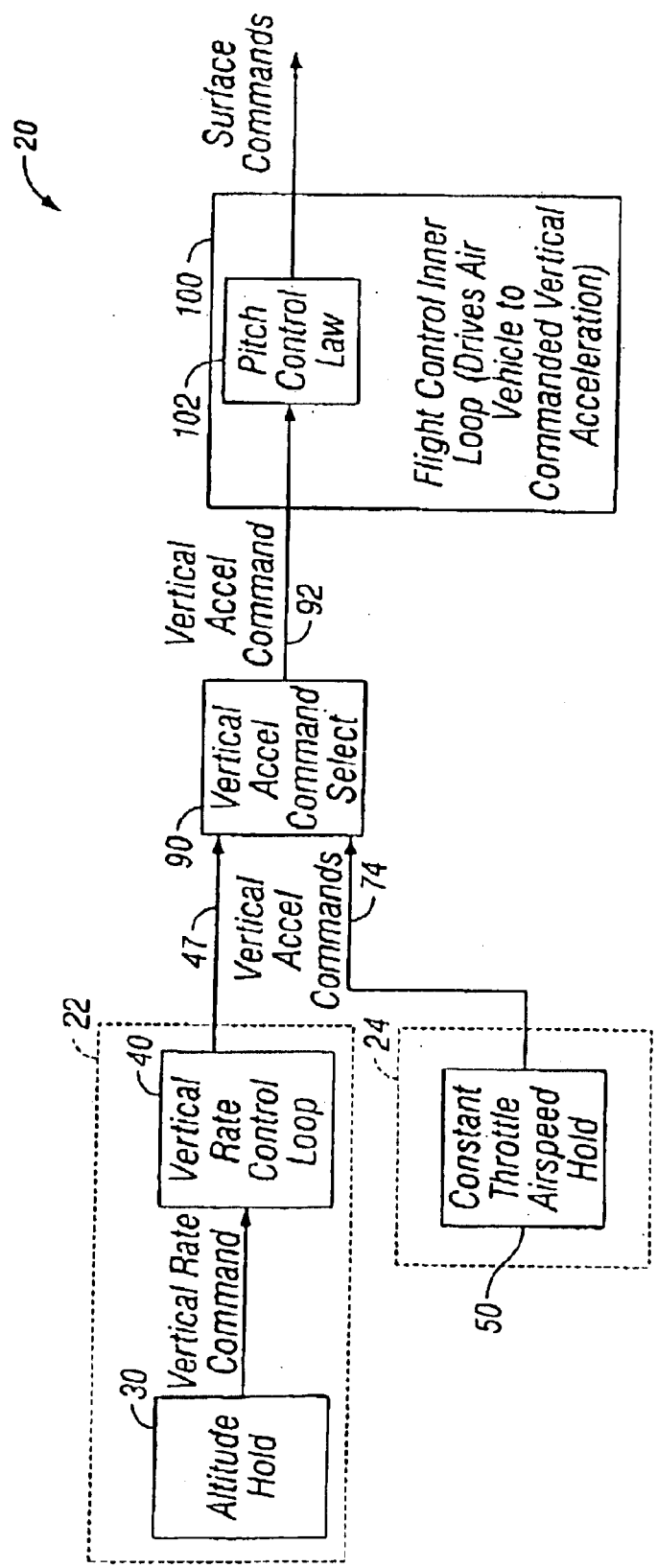
FIG. 2 is a block diagram illustrating a control system for automatic control of air vehicle during catapult launch in accordance with the teachings of the present disclosure.

Referring to FIG. 2, a control system 20 and a control method for automatic control of the air vehicle 10 during catapult launch in accordance with the teachings of the present disclosure is shown. The control system 20 includes a first pitch axis partition 22 that includes an altitude hold control loop 30 and a vertical rate control loop 40, and a second pitch axis partition 24 that includes a constant throttle airspeed hold control loop 50. The control system 20 also includes a vertical acceleration command select loop 90. The altitude control loop 30 and the vertical rate control loop 40 cooperatively determine a vertical rate loop vertical acceleration command 47, which is a first input of the vertical acceleration command select loop 90. The constant throttle airspeed hold control loop 50 determines a constant throttle airspeed hold vertical acceleration command 74, which is the second input of the vertical acceleration command select loop 90. The vertical acceleration command select loop 90 selects one of either the vertical rate loop vertical acceleration command 47 or the constant throttle airspeed hold vertical acceleration command 74. A flight control system 100 of the air vehicle 10 receives the selected vertical acceleration command 92 and drives the air vehicle 10 to the selected vertical acceleration command 92.

Figure 3:
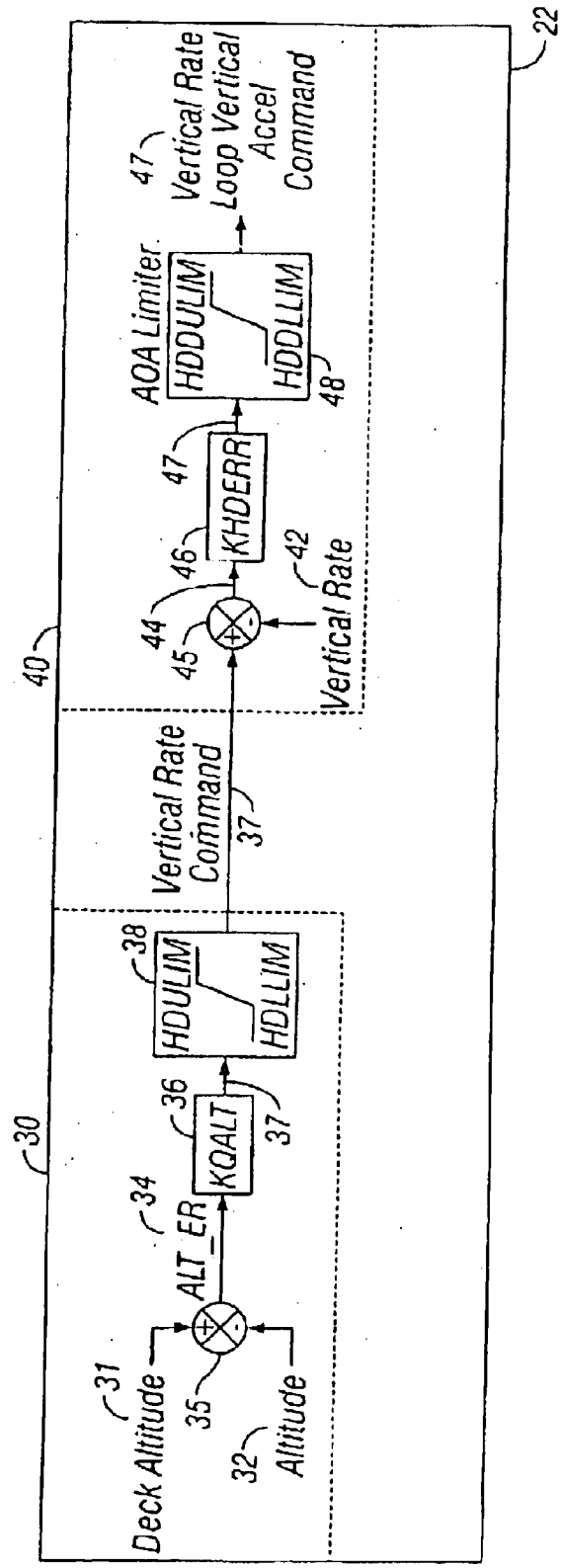
FIG. 3 is a block diagram illustrating an attitude hold control loop of the control system of FIG. 2.

Referring to FIG. 3, the altitude hold control loop 30 of the first pitch axis partition 22 includes two altitude inputs—the flight deck altitude 31 and the actual altitude 32 of the air vehicle. The altitude control loop 30 determines and altitude error 34 (shown as ALT_ER) at junction 35 by subtracting the actual altitude 32 from the flight-deck altitude 31. The altitude error 34 is then multiplied by an altitude hold gain KQALT in module 36 to result in a vertical rate command 37. The altitude hold gain KQALT may be either a predetermined constant or computed each time a vertical rate command 37 is determined. In the disclosed example, the altitude hold gain KQALT is a fixed constant that is predetermined. The vertical rate command 37 passes through a vertical rate limiter 38, which limits the value of the vertical rate command 37 to a range. The vertical rate limiter 38 is defined by an upper limit HDULIM (i.e., H DOT Upper limit or the upper limit of dh/dt with h being the vertical displacement of the air vehicle) and a lower range HDLLIM (i.e., H Dot Lower Limit or the lower limit of dh/dt with h being the vertical displacement of the air vehicle). Any vertical rate command 37 that falls between HDULIM and HDLLIM will maintain its value. However, any vertical rate command 37 that is greater than HDULIM or less than HDLLIM will be assigned the values of HDULIM or HDLLIM, respectively. In the disclosed example, HDLULIM is set to 0.61 m/s (2.0 ft/s) and HDLLIM is set to −0.61 m/s (−2.0 ft/s).

Referring to FIG. 3, the vertical rate control loop 40 of the first pitch axis partition 22 includes two vertical rate inputs—the vertical rate input 37 from the altitude hold control loop 30 and the actual vertical rate 42 of the air vehicle 10. An inertial sensor system (not shown) determines the vertical rate of the air vehicle 10 to provide the actual vertical rate 42. The inertial sensor system may be a primary inertial sensor system or a back-up inertial sensor system that is used if the primary inertial sensor system fails. Accordingly, the air vehicle 10 may have more than one inertial sensor system for redundancy. The vertical rate control loop 40 determines the vertical rate error 44 at a junction 45 by subtracting the actual vertical rate 42 from the vertical rate command 37. Accordingly, depending on whether the vertical rate command 37 is positive or negative, or the actual vertical rate 42 is positive or negative, the vertical rate error 44 may be positive or negative. The vertical rate error 44 is then multiplied by a vertical rate gain KHDERR in module 46 to result in a vertical rate loop vertical acceleration command 47. The vertical rate gain KHDERR may be either a predetermined constant or computed each time a vertical rate loop vertical acceleration command is determined. In the disclosed example, the vertical rate gain KHDERR is a function of airspeed and varies accordingly. The vertical rate loop vertical acceleration command 47 passes through a vertical acceleration limiter 48, which limits the value of the vertical rate loop vertical acceleration command 47 to a range. The vertical acceleration limiter 48 can also be considered an Angle Of Attack limiter (shown as AOA Limiter in FIG. 3) because of the relationship between the Angle Of Attack and the vertical acceleration that is well known to those of ordinary skill in the art. The vertical acceleration limiter 48 is defined by an upper limit HDDULIM (i.e., "H Double Dot Upper Limit" or the upper limit of $d^2h/dt^2$, with h being the vertical displacement of the air vehicle) and a lower range HDDLLIM (i.e., "H Double Dot Lower Limit" or the lower limit of $d^2h/dt^2$, with h being the vertical displacement of the air vehicle). Any vertical rate loop vertical acceleration command 47 that falls between HDDULIM and HDDLLIM will maintain its value. However, any vertical rate loop vertical acceleration command 47 that is greater than HDDULIM or less than HDDLLIM will be assigned the values of HDDULIM and HDDLLIM, respectively. In the disclosed example, HDDULIM is set to a minimum of either 1.0 g (i.e. the gravitational acceleration) or the number of g's for a maximum desired Angle Of Attack, and HDDLLIM is set to 0.5 g (i.e., −4.91 m/s$^2$ or −16.1 ft/s$^2$).

Figure 4:
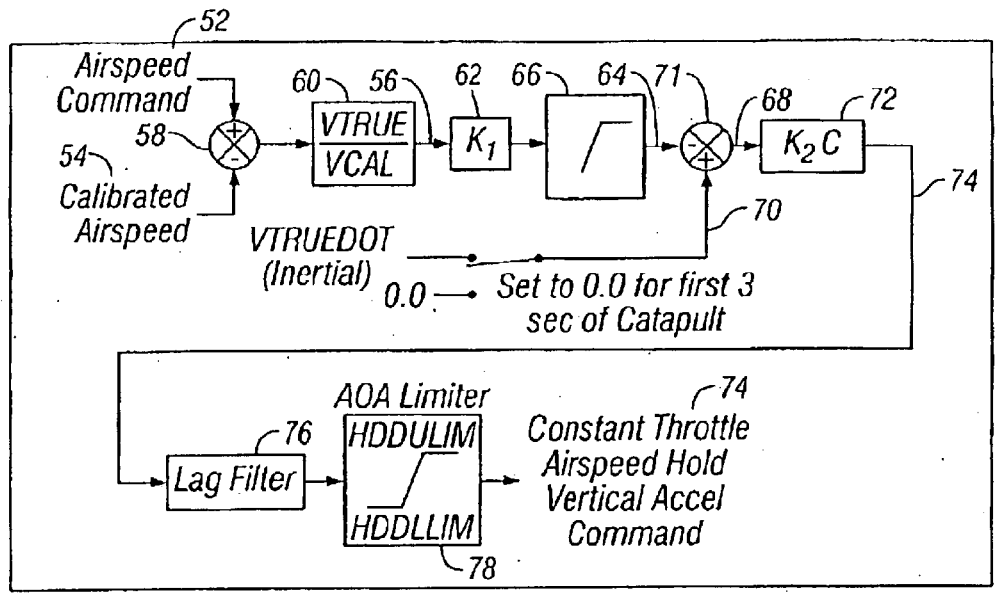
FIG. 4 is a block diagram illustrating a constant throttle airspeed hold control loop of the control system of FIG. 2.

Referring to FIG. 4, the constant throttle airspeed hold control loop 50 of the second pitch axis partition 24 includes two airspeed inputs—an airspeed command 52, which is the desired airspeed of the air vehicle, and a calibrated airspeed 54. The airspeed hold control loop 50 determines a true airspeed error 56 by subtracting the calibrated airspeed 54 from the airspeed command 52 at a junction 58 and multiplying the difference by a calibrated airspeed to true airspeed conversion factor VTRUE/VCAL (i.e., true airspeed divided by the calibrated airspeed) at module 60. The true airspeed error 56 is then multiplied by an airspeed hold gain $K_1$ at module 62 to result in a longitudinal acceleration command 64. The airspeed hold gain $K_1$ may be either a predetermined constant or computed each time a longitudinal acceleration rate command 64 is determined. In the disclosed example, the airspeed hold gain $K_1$ is a fixed constant that is predetermined. The longitudinal acceleration command 64 is then passed through a limiter at module 66, where only the upper range of the longitudinal acceleration command 64 is limited. In the disclosed example, the upper range of the longitudinal acceleration command 64 is limited to 0.61 m/s$^2$ (2.0 ft/s$^2$). Accordingly, any longitudinal acceleration command above 0.61 m/s$^2$ (2.0 ft/s$^2$) will be assigned a value of 0.61 m/s$^2$ (2.0 ft/s$^2$). The airspeed hold control loop 50 determines a longitudinal acceleration error 68 by subtracting the longitudinal acceleration command 64 from a forward acceleration 70 (i.e., VDOT$_{true}$ or $dV_{TRUE}/dt$) of the air vehicle. The forward acceleration 70 of the air vehicle 10 is provided by the inertial sensor system (not shown) of the air vehicle 10 according to the following equation:

$$VDOT_{TRUE} = \frac{(A_{north} \times V_{north}) + (A_{east} \times V_{east}) + (A_{up} \times V_{up})}{\sqrt{(V_{north}^2 + V_{east}^2 + V_{up}^2)}}.$$

Where A is inertial acceleration and V is inertial velocity. Additionally, the forward acceleration 70 of the air vehicle 10 is set to zero during the first few seconds of a catapult launch. During the first few seconds of a catapult launch, the air vehicle 10 will be on the flight deck 12 and accelerating rapidly. Accordingly, the forward acceleration 70 is set to zero for a few seconds until the air vehicle 10 leaves the flight deck 12. In the disclosed example, the forward acceleration 70 is set to zero for three seconds.

The longitudinal acceleration error 68 is passed through a conversion module 72, which multiplies the longitudinal acceleration error 68 by a longitudinal acceleration error gain $K_2$ and a conversion factor C to result in a vertical acceleration command. Module 72 initially multiplies the longitudinal acceleration error 68 by the longitudinal acceleration error gain $K_2$ to result in a longitudinal acceleration command. One of ordinary skill in the art will appreciate that the longitudinal acceleration error gain $K_2$ may be either a predetermined constant or computed each time a longitudinal acceleration command is determined. In the disclosed example, the longitudinal acceleration error gain $K_2$ is a fixed constant that is predetermined and set to 0.2. Conversion module 72 subsequently converts the longitudinal acceleration command to a constant throttle airspeed hold vertical acceleration command 74 by multiplying the longitudinal acceleration command by the conversion factor C. The conversion factor C compensates for the changing relationship between VDOT$_{true}$ (i.e., $dV_{TRUE}/dt$) and the vertical rate (i.e., dh/dt) as derived by conservation of energy principles that are well known to those of ordinary skill in the art.

The airspeed hold control loop 50 further includes a lag filter 76 to prevent an over-controlled response of the air vehicle 10 and to filter out the transient or oscillatory response of the air vehicle 10. The lag filter 76 includes a time constant that may be either predetermined or calculated during the operation of the airspeed hold control loop 50. In the disclosed example, the time constant of the lag filter 76 is set to 0.5.

The filtered constant throttle airspeed hold vertical acceleration command 74 subsequently passes through a vertical acceleration limiter 78, which limits the value of the constant throttle airspeed hold vertical acceleration command 74 to a range. Again, the vertical acceleration limiter 78 can also be considered an Angle Of Attack limiter (shown as AOA Limiter in FIG. 4) because of the relationship between the Angle Of Attack and the vertical acceleration that is well known to those of ordinary skill in the art. The vertical acceleration limiter 78 is defined by an upper limit HDDULIM (i.e., "H Double Dot Upper Limit" or the upper limit of $d^2h/dt^2$ with h being the vertical displacement of the air vehicle) and a lower range HDDLLIM (i.e., "H Double Dot Lower Limit" or the lower limit of $d^2h/dt^2$ with h being the vertical displacement of the air vehicle). Any constant throttle airspeed hold vertical acceleration command 74 that falls between HDDULIM and HDDLLIM will maintain its value. However, any constant throttle airspeed hold vertical acceleration command 74 that is greater than HDDULIM or less than HDDLLIM will be assigned the values of HDDULIM and HDDLLIM, respectively. In the disclosed example, HDDULIM and HDDLLIM are set to the values of HDDULIM and HDDLLIM that are calculated for the Angle Of Attack Limiter 48 in the vertical rate control loop 40.

Figure 5:
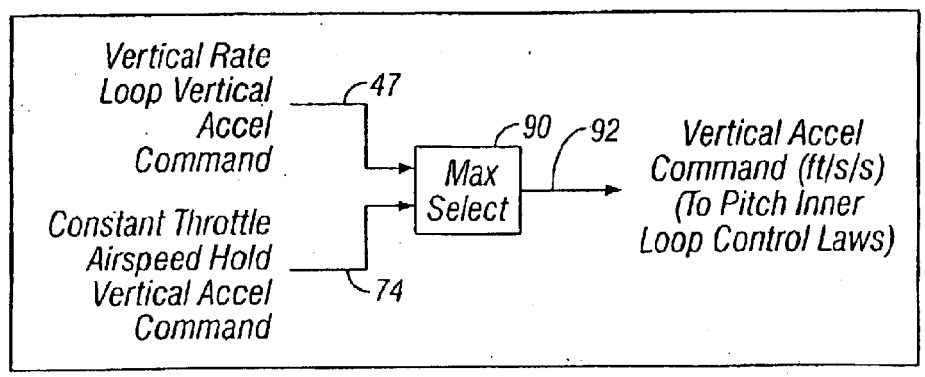
FIG. 5 is a block diagram illustrating a vertical acceleration command select loop of the control system of FIG. 2.

Referring to FIG. 5, the vertical acceleration command select loop 90 receives both the vertical rate loop vertical acceleration command 47 from the altitude control loop 40 and the constant throttle airspeed hold vertical acceleration command 74 from the airspeed hold control loop 50. The vertical acceleration command selection loop 90 determines a selected vertical acceleration command 92 by selecting the maximum one of either the vertical rate loop vertical acceleration command 47 or the constant throttle airspeed hold vertical acceleration command 74. The flight control system 100 (shown in FIG. 2), and in particular the pitch axis control 102 (shown in FIG. 2) of the flight control system 100 receives the selected vertical acceleration command 92 and drives the air vehicle 10 to the selected vertical acceleration command 92.

One of ordinary skill in the art will readily recognize that two scenarios may occur when the air vehicle 10 leaves the flight deck 12. In the first exemplary scenario, airspeed achieved by the end of the catapult stroke is insufficient to climb to altitude by maintaining a nominal Angle Of Attack. Accordingly, the air vehicle 10 will most likely sink until either the true airspeed increases to generate sufficient lift for climbing, or the air vehicle 10 increases its Angle Of Attack to generate a higher lift. In the second exemplary scenario, airspeed at the end of the catapult stroke is sufficient to allow an immediate climb at an Angle Of Attack that is at or below a nominal desired value. Accordingly, the air vehicle 10 will most likely either maintain an altitude equal to that of the flight deck 12 or climb.

In the first exemplary scenario, the air vehicle 10 will sink subsequent to leaving the flight deck. Accordingly, the actual altitude 32 will be less than the flight-deck altitude 31. Referring to FIG. 3, the altitude hold control loop 30 generates a vertical rate command 37 as described in the foregoing, which is indicative of a vertical rate that can be adopted by the air vehicle 10 to reach the flight deck altitude 31. The vertical rate control loop 40 receives as input the vertical rate command 37 and the actual vertical rate 42 of the air vehicle 10 and generates the vertical rate loop vertical acceleration command 47, which is indicative of a vertical acceleration that can be adopted by the air vehicle 10 to reach the flight deck altitude 31.

Referring to FIG. 4, the airspeed hold control loop 50 receives as inputs the airspeed command 52 and the calibrated airspeed 54 to determine the longitudinal acceleration command 64, which is indicative of a longitudinal acceleration that can be adopted by the air vehicle 10 to reach the commanded airspeed. As described above, the airspeed hold control loop 50 subsequently determines the constant throttle airspeed hold vertical acceleration command 74 based on the forward acceleration 70 and the longitudinal acceleration command 64.

One of ordinary skill in the art will readily appreciate that the sinking of the air vehicle 10 should be arrested prior to controlling the airspeed of the air vehicle. In particular, because the air vehicle 10 will be at full throttle during launch, the airspeed of the air vehicle 10 should not be controlled prior to controlling the sinking, because only a nose down pitch command could in such a scenario increase the airspeed of the air vehicle 10 beyond the acceleration provided by the engine thrust. Accordingly, if the air vehicle 10 is sinking subsequent to leaving the flight deck 12, the vertical rate loop vertical acceleration command 47 from the altitude hold control loop 40 will have a higher value than the constant throttle airspeed hold vertical acceleration command 74 from the airspeed hold control loop 50. Therefore, the vertical acceleration command select loop 90 selects the vertical rate loop vertical acceleration command as input to the flight control system 100 of the air vehicle. The flight control system 100 will accordingly increase the Angle Of Attack of the air vehicle 10 so as to result in a vertical acceleration for the air vehicle 10 equal to the vertical rate loop vertical acceleration command 47.

Sometime after the sink rate is arrested, the value of the vertical rate loop vertical acceleration command 47 from the altitude hold control loop 40 becomes smaller than the constant throttle airspeed hold vertical acceleration command 74 from the airspeed hold control loop 50. Accordingly, the vertical acceleration command select loop 90 selects the constant throttle airspeed hold vertical acceleration command 74 as input to the flight control system 100. Therefore, the flight control system 100 will accordingly apply the constant throttle airspeed hold vertical acceleration command 74 to the air vehicle 10 to drive the air speed of the air vehicle 10 to the airspeed command 52. After the airspeed of the air vehicle 10 reaches airspeed command 52, the excess power of the air vehicle 10 is used by the air vehicle 10 to climb while maintaining the airspeed at the level of the airspeed command 52.

In the second exemplary scenario, the air vehicle 10 will not sink subsequent to leaving the flight 12 deck because of sufficient airspeed reached for an immediate climb by the end of the catapult stroke. Accordingly, the constant throttle airspeed hold vertical acceleration command 79 will have a higher value than the vertical rate loop vertical acceleration command. Therefore, the vertical acceleration command select loop 90 will select the constant throttle airspeed hold vertical acceleration command 74 to be applied as input to the flight control system 100. The flight control system 100 will apply the constant throttle airspeed hold vertical acceleration command 74 to the air vehicle 10 to drive the air speed of the air vehicle 10 to the airspeed command 52. After the airspeed reaches airspeed command 52, the excess power of the air vehicle 10 is used by the air vehicle 10 to climb while maintaining the airspeed at the level of the airspeed command 52.

One of ordinary skill in the art will appreciate that the disclosed system and method can be implemented in both manned and unmanned air vehicles. Additionally, the disclosed system uses, as inputs, sensed vertical rates and accelerations and forward rates from an inertial sensor system, rather than using any Angle Of Attack sensors. Accordingly, sensor biases present in Angle Of Attack sensors as a result of damage or failure do not adversely affect the disclosed system and method. Furthermore, because inertial sensor data is used for the disclosed control system and method, the flight control system 100 of the air vehicle 10 will provide the necessary Angle Of Attack during catapult launch. Furthermore, because the Angle Of Attack of the air vehicle 10 is controlled by the flight control system 100 based on inertial data, the air vehicle 10 will have a high tolerance to adverse conditions, such as, high gust and variations in catapult performance.

Although certain apparatus and method constructed in accordance with the teachings of the invention have been described herein, the scope of coverage of this patent is not limited thereto. On the contrary, this patent covers all embodiments of the teachings of the invention fairly falling within the scope of the appended claims either literally or under the doctrine of equivalents.

What is claimed is:

1. A catapult launch control system for an air vehicle having a flight control system, said catapult launch control system comprising:

an inertial sensor system adapted to provide a vertical rate of said air vehicle and a forward acceleration of said air vehicle;

an altitude hold control loop adapted to receive an altitude command and an altitude of said air vehicle to generate a vertical rate command;

a vertical rate control loop adapted to receive said vertical rate command and said vertical rate of said air vehicle and adapted to generate a vertical rate loop vertical acceleration command;

a constant throttle airspeed hold control loop adapted to receive an airspeed command, an airspeed of said air vehicle, and said forward acceleration of said air vehicle and adapted to generate a constant throttle airspeed hold vertical acceleration command; and a vertical acceleration command select loop adapted to select one of said vertical rate loop vertical acceleration command or said constant throttle airspeed hold vertical acceleration command to provide a selected vertical acceleration command;

wherein said flight control system drives said air vehicle to said selected vertical acceleration command.

2. A catapult launch control system in accordance with claim 1, wherein said inertial sensor system is adapted to determine an inertial velocity and an inertial acceleration of said air vehicle.

3. A catapult launch control system in accordance with claim 1, further comprising at least one back-up inertial sensor system.

4. A catapult control system in accordance with claim 1, wherein said altitude hold control loop comprises:

an altitude error junction adapted to determine an altitude error from said altitude command and said altitude of said air vehicle;

at least one altitude-hold gain adapted to determine a vertical rate command responsive to said altitude error; and a vertical rate limiter adapted to limit said vertical rate command to a vertical rate range.

5. A catapult launch control system in accordance with claim 4, wherein said altitude-hole gain is a constant.

6. A catapult launch control system in accordance with claim 1, wherein said vertical rate control loop comprising:

a vertical rate error junction adapted to determine a vertical rate error from said vertical rate command and said vertical rate;

at least one vertical rate gain adapted to determine said vertical rate loop vertical acceleration command responsive to said vertical rate error; and a vertical acceleration limiter adapted to limit said vertical rate loop vertical acceleration command to a vertical acceleration range.

7. A catapult launch control system in accordance with claim 6, wherein said vertical rate gain is a function of the airspeed.

8. A catapult launch control system in accordance with claim 1, said constant throttle airspeed hold control loop comprising:

an airspeed error junction adapted to determine an airspeed error from said airspeed command and said airspeed of said air vehicle;

at least one airspeed hold gain adapted to determine a longitudinal acceleration command responsive to said airspeed error;

a longitudinal acceleration limiter adapted to limit said longitudinal acceleration command;

a longitudinal acceleration error junction adapted to determine a longitudinal acceleration error from said longitudinal acceleration command and said forward acceleration;

a conversion module adapted to determine said constant throttle airspeed hold vertical acceleration command responsive to said longitudinal acceleration error;

a lag filter adapted to filter said constant throttle airspeed hold vertical acceleration command; and a vertical acceleration command limiter adapted to limit said constant throttle airspeed hold vertical acceleration command to a vertical acceleration range.

9. A catapult launch control system in accordance with claim 8, wherein said airspeed gain is a constant.

10. A catapult launch control system in accordance with claim 8, wherein said conversion module includes at least one longitudinal acceleration error gain and a longitudinal acceleration to vertical acceleration conversion factor.

11. A catapult launch control system in accordance with claim 10, wherein said longitudinal acceleration error gain is a constant.

12. A catapult launch control system in accordance with claim 1, wherein said vertical acceleration command select loop is adapted to select a maximum of said vertical rate loop vertical acceleration command or said constant throttle airspeed hold vertical acceleration command.

13. A method of controlling an air vehicle having a flight control system during catapult launch, said method comprising:

determining a vertical rate loop vertical acceleration command for said air vehicle to reach and maintain an altitude command responsive to an altitude of said air vehicle and a vertical rate of said air vehicle determined by an inertial sensor system;

determining a constant throttle airspeed hold vertical acceleration command for said air vehicle to reach and maintain an airspeed command responsive to an airspeed of said air vehicle and a forward acceleration of said air vehicle determined by said inertial sensor system; and determining a selected vertical acceleration command responsive to selecting one of said vertical rate loop vertical acceleration command or said constant throttle airspeed hold vertical acceleration command, the selected vertical acceleration command causing said flight control system to drive said air vehicle to said selected vertical acceleration command.

14. A method of controlling an air vehicle in accordance with claim 13, wherein selecting one of said vertical rate loop vertical acceleration command or said constant throttle airspeed hold vertical acceleration command comprises selecting a maximum of said vertical rate loop vertical acceleration command or said constant throttle airspeed hold vertical acceleration command.

15. A method of controlling an air vehicle in accordance with claim 13, wherein determining said forward acceleration of said vehicle comprises sensing an inertial velocity and an inertial acceleration of said air vehicle.

16. A method of controlling an air vehicle in accordance with claim 13, wherein determining a vertical rate loop vertical acceleration command for said air vehicle comprises:

determining an altitude error responsive to said altitude command and said altitude of said air vehicle;

determining a vertical rate command by applying an altitude hold gain to said altitude error, limiting said vertical rate to a range of vertical rates;

determining a vertical rate error responsive to said vertical rate command and said vertical rate of said air vehicle;

determining a vertical rate loop vertical acceleration command by applying a vertical rate gain to said vertical rate error; and limiting said vertical rate loop vertical acceleration command to a range of vertical accelerations.

17. A method of controlling an air vehicle in accordance with claim 13, wherein said step of determining a constant throttle airspeed hold vertical acceleration command for said air vehicle comprises:

determining an airspeed error responsive to said airspeed command and airspeed of said air vehicle;

determining a longitudinal acceleration command by applying a airspeed hold gain to said airspeed error;

limiting said longitudinal acceleration command to a range of longitudinal accelerations;

determining a longitudinal acceleration error responsive to said longitudinal acceleration command and said forward acceleration of said air vehicle;

converting said longitudinal acceleration error to a constant throttle airspeed hold vertical acceleration command;

filtering said constant throttle airspeed hold vertical acceleration command with a lag filter; and limiting said constant throttle airspeed hold vertical acceleration command to a range of vertical accelerations.

18. A method of controlling an air vehicle having a flight control system during catapult launch, the method comprising:

determining an altitude error responsive to a difference between a flight deck altitude and an altitude of said air vehicle;

determining a vertical rate command indicative of a vertical rate for said air vehicle to reduce said altitude error;

determining a vertical rate of said air vehicle by an inertial sensor system;

determining a vertical rate loop vertical acceleration command responsive to a difference between said vertical rate command and said vertical rate of said air vehicle;

determining an airspeed error responsive to a difference between an airspeed command and a calibrated airspeed of said air vehicle;

determining a longitudinal acceleration command indicative of a longitudinal acceleration for said air vehicle to reduce said airspeed error;

determining a forward acceleration of said air vehicle by said inertial sensor system;

determining a constant throttle airspeed hold vertical acceleration command responsive to a difference between said longitudinal acceleration command and said forward acceleration of said air vehicle; and selecting one of said vertical rate loop vertical acceleration command or said constant throttle airspeed hold vertical acceleration command as input to said flight control system;

wherein said flight control system drives said air vehicle to the selected one of said vertical rate loop vertical acceleration command or said constant throttle airspeed hold vertical acceleration command.

19. A method of controlling an air vehicle in accordance with claim 18, wherein the selecting of one of said vertical rate loop vertical acceleration command or said constant throttle airspeed hold vertical acceleration command as input to said flight control system comprises selecting a maximum one of said vertical rate loop vertical acceleration command or said constant throttle airspeed hold vertical acceleration command as input to said flight control system.

* * * * *